(12) United States Patent
Coppersmith et al.

(10) Patent No.: US 6,185,679 B1
(45) Date of Patent: Feb. 6, 2001

(54) METHOD AND APPARATUS FOR A SYMMETRIC BLOCK CIPHER USING MULTIPLE STAGES WITH TYPE-1 AND TYPE-3 FEISTEL NETWORKS

(75) Inventors: Don Coppersmith, Ossining; Rosario Gennaro, New York; Shai Halevi, Heartsdale; Charanjit S. Jutla, Elmsford, all of NY (US); Stephen M. Matyas, Jr., Manassas, VA (US); Luke James O'Connor, Adliswil (CH); Mohammed Peyravian, Cary, NC (US); David Robert Safford, Brewster; Nevenko Zunic, Wappingers Falls, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/027,769

(22) Filed: Feb. 23, 1998

(51) Int. Cl.[7] ......................................................... H04L 9/00
(52) U.S. Cl. .............................................. 713/150; 380/37
(58) Field of Search ................................ 380/28, 29, 42, 380/37

(56) References Cited

U.S. PATENT DOCUMENTS 4,157,454 * 6/1979 Becker ..................... 178/22
5,724,428 * 3/1998 Rivest ..................... 380/37

OTHER PUBLICATIONS

B. Schneier, Description of a New Variable–Length Key, 64–Bit Block Cipher (Blowfish), Dec. 1993.*
Y. Zhen, On the Construction of Block Ciphers Provably Secure and Not Relying on Any Uproved Hypothesis, 1989.*
B. Schneier, et al. Unbalanced Feistel Networks and Block–Cipher Design, 1996.*
B. Schneier, Applied Cryptography 2e John Wiley pp. 193, 198–201, 347, 1996.*

* cited by examiner

Primary Examiner—Gail O. Hayes
Assistant Examiner—James Seal
(74) Attorney, Agent, or Firm—Jeanine S. Ray-Yarletts; Marcia L. Doubet

(57) ABSTRACT

The present invention provides a technique, system, and computer program for a symmetric key block cipher. Variable block sizes and key sizes are supported, as well as a variable number of rounds. The cipher uses multiple stages of processing, where the stages have different structures and different subround functions, to provide excellent resistance to both linear and differential attacks. Feistel Type-1 and Type-3 are both used, each during different stages. The number of rounds may vary among stages. Subkeys are used in some, but not all, stages. The variable-length keys can be precomputed. A novel manner of using data-dependent rotation in a cipher is defined.

25 Claims, 9 Drawing Sheets

The general structure of the encryption operation

The general structure of the encryption operation

Data Flow in Encryption Stage 2, One Full Round

Data Flow in Encryption Stage 4, one full round exclusive or addition

An even full round in Stage 3

An odd full round in Stage 3

FIG. 7A

An example of S-box S0

```
WORD S0[256] = {
0xab41eef5,0x3646c9ab,0x165ef3f1,0xebc71f39,0x931693da,0x8d73bbd0,
0x2202371c,0x33f87ecd,0x4f2d7c9c,0xbe8e7c9e,0x41724428,0xc95d52ef,
0x49104142,0xdb55bc74,0x2fef9593,0xeae66df8,0xca991569,0x7e209991,
0xd30600df,0xc4302a0c,0x15e97589,0x59f939d4,0xebca483e,0x5d222488,
0x0c0bcc9d,0xbab9161a,0x4c4bc53d,0x623ceb2e,0xd240afc4,0x0d9a3469,
0x01e97f47,0x50f3fa17,0xcbcb2178,0xfc268442,0x339e4774,0xc3d99e24,
0x1e8d7b4f,0x21bd3153,0x52223d05,0x6c372136,0x7e16e105,0x472f8f63,
0x1b9cb09f,0x33316b8e,0x039a3a8f,0xa9434e8f,0xc241c05c,0xe94e7203,
0xe56c1be9,0x9618f165,0x2dde3628,0x7137aad7,0xd54f47f7,0x85182766,
0x7c41c9d3,0x60d5154b,0x8916dd5e,0xabdce6be,0x8951aa92,0xd7a5d673,
0x3b29ca80,0x8cf18e8e,0x6340d062,0x17b6f1f2,0x5b2a6418,0xe20221a8,
0x7a136915,0xa8c95df6,0x8eba0d1e,0x282f21a5,0xd8efdc93,0xe76fb103,
0xaabd68b7,0x2346f42d,0xc0e5f419,0x46936767,0xdc194436,0xb3ee8aca,
0x2888154f,0xb48ac6d5,0x57c9f0d2,0x1604f786,0xc23f364e,0xa0e1f882,
0x631f4f44,0xdd14b61d,0xd3217562,0xbea86b64,0x62b8b596,0x94afce5d,
0x2139d8f5,0x3dbd8436,0x70c35444,0x5de1981d,0x679f0be4,0xd2a5f94a,
0x088a142a,0xa6eab41c,0x3300d1ea,0x5da0f7b5,0x740e0fa1,0x31f24f7a,
0xc69a37b4,0x3e625ddb,0xecd102a8,0xdac9d198,0x87470834,0xdcf37e24,
0x1797813b,0xdbb88a5d,0x224b3879,0xdf763490,0x12477446,0xc88a5d86,
0x81c8b2d3,0x03959088,0x118c35c4,0x733f646c,0x190a0182,0x1b8eb126,
0x7fa7855c,0xcf1b1367,0x916facf3,0x85aaff6f,0x148d4d82,0x92a9d650,
0xa1d27601,0x0cf85f94,0xd87e6694,0xa07d9eb0,0xeef72d5a,0x3407cb9d,
0x9e2072b9,0x4edc641c,0x8b1571b1,0xf50578d1,0x187049dc,0xbe6661fc,
0x3be97076,0x94b53daa,0x75232019,0xb8347e92,0x7de46eef,0x54285bc7,
0x04f464b1,0xb8f98ba5,0xfabd0ee4,0x15f823f6,0x6f3f484d,0xbabb00ec,
0x1e88ecd4,0xf84d7a29,0x802e4571,0x99b0eea8,0xf7daca18,0xe96cc0d9,
0x7793b696,0x8aa4fa1e,0x8c6dc00e,0xe3848b1d,0xf84375a8,0x34c3e730,
0xd5918aef,0x429e0ae7,0xa83bef99,0xa0395535,0x00554e57,0x6021f221,
0x38fc67b6,0xfb44e9b8,0x370d91c4,0xc875c4d1,0xf1d5f728,0x200c8e9a,
0xb705ffc7,0x6a47d894,0x40081c08,0x3338c2f9,0x3ac465ad,0x77a93eea,
0xa68c1c80,0x5c5fa8f5,0x9c562bdb,0xb4251ec5,0x73c1b136,0xfb66d60b,
0x924035fb,0x0f4992b6,0x4fedae98,0xbd2afeb5,0x94ab9a75,0x5a34accc,
0xd3986fd6,0xf14c51cb,0x5d977183,0x73c2773e,0x5de95ab7,0x5f46293b,
0xd4519566,0x5dcd40e8,0xec9d71c0,0x9af14ee4,0x541346c5,0x592f8c31,
0x8d8c7b52,0xe8330ba4,0x3b7d1178,0xc5c5ef2f,0xe9484c16,0x9cc8eb3d,
0xaefc73da,0xb33e5515,0x8d9404bf,0xe9f1974b,0xa8c85e8a,0x6eb38096,
0x35e67956,0x3ad90646,0xad3a783a,0x5c5974da,0xcf940854,0xac346bab,
0x4bb2b390,0xdb8f49ba,0x85ee59eb,0x840017c4,0xdca5d33d,0xf9689585,
0x3c84c543,0x0a5cac33,0x29f86917,0x373dbf09,0x649b4c31,0xd844c9e7,
0xee09a4d0,0x09750285,0x8613e388,0xe85a21a6,0x33692779,0x07247270,
0xb48a8598,0x609b91e0,0xc860b2c0,0xfcc19fd0,0xbb4767f8,0x8d320818,
0x0df77bfa,0xd668aaf4,0x67a2ca55,0x30c237d2,0x32aea061,0x14e1a447,
0x92b8cc74,0x0b06bee1,0x9e8b18da,0x9743a085 };
```

FIG. 7B
An example of S-box S1

```
WORD S1[256] = {
0xf3604037,0x98dc0cb2,0x4445cdf9,0x4fa1d12b,0x22cad95c,0xebad501b,
0x404ca384,0x86a977d4,0xb480af5c,0x1cab9da0,0x1bea04e0,0x4b006ff1,
0xf8966754,0x3f54a03e,0x28850d27,0x751dab63,0xd34fdb63,0xf1cc5221,
0x06979489,0x99cddda5,0xf5f9f565,0xe3aa57c0,0x8c3caaad,0x8eab31a7,
0x164af648,0xa0ede1af,0x4cb7db5a,0x51257e4b,0x32db282e,0xbc438f89,
0x232fae48,0x6a1d41f9,0x68ffd6f0,0x45d9652d,0x5ce80984,0x56506be1,
0x5f434743,0x258564b1,0x4c82b848,0x69278935,0xbfe745f4,0xaddd2673,
0xf4f22200,0x2570aa64,0x3997602e,0xb4b27912,0x7f2a59a3,0xc0377f3f,
0xa85949e4,0xb2f76bda,0xc68b0b89,0x87ce811f,0x417f1a48,0x4f0a0cd7,
0xdb3f6f3f,0xa12c728b,0x5d838310,0x0b2b4adf,0xde0cbb56,0x3d749cb9,
0x7cb137f8,0x9499f05c,0xafe5ab50,0x60708add,0x885aca2f,0x5a21fbf2,
0x86160208,0x500ec0ee,0xf6f7d78a,0xac24f9fb,0x2070925d,0x9e9daef3,
0xc9cda505,0x1f85d716,0x0cb05229,0xdb690bf4,0x39b4bef1,0x209b3139,
0xda8fa45f,0xd22711c3,0xcecd2ea4,0x15993d65,0xa09a3965,0x4057084e,
0xc5355f1c,0x1c6b8936,0x6d8f303a,0x1ce633b4,0xb68b1475,0xec4f058c,
0x6a79388d,0xd0d267b5,0x38c02b7d,0x6f43d2ae,0x7e36afdb,0xc0b33e2b,
0x48d14966,0x93c1496f,0x8036c2cb,0xaa582784,0xf951396f,0xe4668cab,
0xe4a3233c,0x9a0ebbaf,0x2a9888dd,0x8b6fac0b,0xbeaa99a8,0x2ce3db18,
0x2b31b8b1,0xf178f1e8,0x667e5025,0x34e1cbe3,0xe0dee578,0x81d0e94a,
0x9fa211e5,0xfe1d0be1,0xde89c123,0xd4cc5026,0x7117e14f,0xfef5dc14,
0xcb983e6e,0xb0daf8f8,0x5707035d,0x97ab30be,0x9e3e2403,0x1bbba51c,
0xf9bf3634,0x6b0d591d,0xa45ddc7f,0x51804196,0xad57063d,0xfed694fd,
0xf5720ea9,0x98a1b7c7,0x240f48c4,0xa7387482,0x2bb977a6,0x6e150fec,
0x61d7fc25,0x0025482d,0x0375b228,0x06046452,0xe7a7fb29,0x3f2a1539,
0x2a84d2df,0x96f5ef88,0x0bc49945,0x096b697e,0xd083e174,0xc7e5fe54,
0x557fee49,0x17e359a6,0x8c94673f,0x63ae66f5,0x5516ecd3,0x88451e75,
0xa350c34b,0x13bbcc2d,0x1c09d60d,0x95ac78fa,0x08005464,0x1541a7da,
0x275753d3,0xab0b8927,0xd5eb4932,0x7b024b66,0x3accdfc8,0x06f866a5,
0xce524201,0x0a6d7fb4,0xfd453587,0x2a75a10a,0xb1a988d3,0xbb9e3b39,
0x51138a7a,0x89038432,0x4f728035,0xa8bb5c3f,0x6f79b2a5,0x657be129,
0x1695843e,0x5e6fc466,0x0d7a7a3b,0xfdd05129,0x6d3e2afc,0xf0c49adc,
0x6931aa5e,0x90e28a9e,0xe543c097,0xfc43aed9,0xef8821cf,0xf703b4c6,
0x422b6231,0x4ee4a078,0xd59e09ce,0x677bf812,0x461261cb,0x51c16aab,
0xff410cf7,0x7986637f,0xddeeb049,0xee072735,0x6cfd0e1f,0xfdc8286b,
0xb04dd152,0x48871990,0x1829eec9,0x214114ef,0xbcd734ae,0x7ba2a614,
0x9083ce0d,0x71e45b2f,0x141c092f,0x6cb0f379,0x9d801c6c,0xacc44c48,
0x90dbfe4b,0x3caad0df,0x223a8d33,0xe6f9a3d3,0x60ca1d4e,0xa0e0cbad,
0xd628630e,0x7cc63e5e,0xa12265ce,0x195c44dc,0x8241107a,0xe5c6bc07,
0x0f90d0d5,0x74c58f28,0x38319fec,0xa9308a2b,0x40393f83,0x9ed7c3fb,
0x5e5320a6,0xab62c9c0,0xf23cae02,0xbfe71568,0x8f5f14af,0x972b514b,
0x18136f53,0x740af30c,0xd62c1f6f,0xfee96a5a,0xb840394c,0xe8339c3a,
0x8b049b02,0xae68f477,0x64367e49,0x5c95eb87,0xe589d06b,0xe2ed15f3,
0xdbdc1107,0xe1090134,0x37ecd34b,0xf535c9d4 };
```

METHOD AND APPARATUS FOR A SYMMETRIC BLOCK CIPHER USING MULTIPLE STAGES WITH TYPE-1 AND TYPE-3 FEISTEL NETWORKS

BACKGROUND OF THE INVENTION

1. Related Invention

IBM application Ser. No. 09/027,765 entitled "Method and Apparatus for a Symmetric Block Cipher using Multiple Stages", filed Feb. 23, 1998.

2. Field of the Invention

The present invention relates to cryptography, and deals more particularly with a system and method for a symmetric key block cipher. This cipher uses multiple stages, where the stages have different structures and different subround functions. The cipher allows the block size, key size, and number of rounds per stage of ciphering to vary.

3. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

In addition to preventing unintended disclosure, cryptography also provides a mechanism for preventing unauthorized alteration of data transmitted or stored in electronic form. After the data has been transformed cryptographically, an unauthorized person is unlikely to be able to determine how to alter the data, because the specific data portion of interest cannot be recognized. Even if the unauthorized user knew the position of the data portion within a data file or message, this position may have been changed by the transformation, preventing the unauthorized person from merely substituting data in place. If an alteration to the transformed data is made by the unauthorized user despite the foregoing difficulties, the fact of the alteration will be readily detectable, so that the data will be considered untrustworthy and not relied upon. This detection occurs when the transformation is reversed: the encrypted data will not reverse to its original contents properly if it has been altered. The same principle prevents unauthorized addition of characters to the data, and deletion of characters from the data, once it has been transformed.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Data encryption systems are well known in the data processing art. In general, such systems operate by performing an encryption operation on a plaintext input block, using an encryption key, to produce a ciphertext output block. "Plaintext" refers to the fact that the data is in plain, unencrypted form. "Ciphertext" indicates that the data is in enciphered, or encrypted, form. The receiver of an encrypted message performs a corresponding decryption operation, using a decryption key, to recover the original plaintext block.

A cipher to be used in a computer system can be implemented in hardware, in software, or in a combination of hardware and software. Hardware chips are available that implement various ciphers. Software algorithms are known in the art as well.

Encryption systems fall into two general categories. Symmetric (or secret key) encryption systems use the same secret key for both encrypting and decrypting messages. An example of a symmetric encryption system is the Data Encryption Standard (DES) system, which is a United States federal standard described in NBS FIPS Pub 46. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir, and Adleman.

The category of symmetric encryption systems can be further subdivided into those which operate on fixed size blocks of data (block ciphers), and those which operate on arbitrary length streams of data (stream ciphers).

While there are many methods of symmetric key block encryption, most popular methods (for example, DES, CAST, RC5, and Blowfish) are based on Type-2 Feistel Networks. A Type-2 Feistel Network consists of dividing the data to be encrypted into two halves, and then performing some number of rounds, where each round consists of transforming the left half of the data based on the right half of the data, and then transforming the right half based on the modified left half. The two transformations are called subrounds; in the case of RC5, for example, there are two subrounds in each of 16 full rounds. These transformations must be invertible. That is, it must be possible to perform some set of operations during decryption that will reverse the transformations performed during encryption. In a standard Feistel network, some non-invertible function of one half of the data is simply exclusive-OR'd with the other half, as the exclusive OR operation provides invertibility, but any invertible function may be used in the general case.

Feistel Networks are not limited to this case of dividing the data into two equal halves. Alternatively, in a Type-1 Feistel the data is divided into n equal words, where n>2. If these words are labeled A(1) to A(n), then a full round consists of n subrounds, where each subround consists of transforming word A(i) based on the value of word A(i−1) (with A(1) transformed by A(n)).

Similarly, a Type-3 Feistel can be constructed in which the data is divided into n equal words, where n>2, but in which each word is used to transform more than one (possibly all) of the other words. For example, A(1) could be used to transform A(2), A(3), and A(4) in one subround. A full round consists of n such subrounds.

Feistel based ciphers typically add additional invertible transformations before, and/or after, each full round. For example, some ciphers exclusive or the entire data block with subkey data before the first round, to complicate certain attacks. "Subkey" refers to using a different key during different rounds, where the subkey values are derived from an input key.

The distinguishing features of different Feistel based ciphers are determined by the choice of the function used to modify a given data word in each subround. Different functions provide different tradeoffs between speed, data size, and security.

Many ciphers, such as DES and CAST, base their subround functions on a construct called a substitution box, or S-box, which is an array of data elements. In operation, a cipher block data word is used as an index into the S-box, and the value at that location is then used as the output value. The entries in the S-box are carefully chosen to have good properties for resistance to various attacks, including differential and linear analysis. Some desirable properties of S-boxes include that if the input words vary by one bit, on average, half the output bits should change, so that even small changes in the input data rapidly spread to all the output bits. Also, the entries in the S-box should be chosen to have little correlation to the index, to provide good resistance to linear attacks. While S-box based functions may provide excellent security, they tend to be slow in software implementations, especially on processors with small register sets, due to the costs of index calculation, and the corresponding higher use of register resources.

Other ciphers, such as RC5, base their subround functions on bit-wise rotations, in which one data word is used to specify an amount to rotate the target word. Data-dependent rotation provides a very fast subround function, as there are no index calculations and no memory references needed, and all the operations can be kept within the registers. Data-dependent rotations, however, tend to have relatively poor resistance to differential attacks, requiring more rounds to ensure security.

There are also a few ciphers, most notably IDEA and its variants, which use integer multiplication in their round functions. Because of the good diffusion properties of the multiplication operation, the round functions of these ciphers have very good resistance to differential attacks. On the other hand, to achieve this resistance these ciphers implement a multiplication in an algebraic field, which forces them to perform operations modulo some prime number. (Typically, this prime is chosen as $2^{16}+1$). This modular arithmetic complicates operation of the round function and causes a significant slowdown of the cipher. Also, the complicated round function of these ciphers, and in particular the fact that data words are multiplied by each other, makes it harder to analyze their properties and evaluate their security.

In view of the above, a stronger, more flexible algorithm is needed. One way to make a cipher stronger is to increase the number of rounds of ciphering performed: with each successive transformation, the resulting encryption becomes more difficult to break. Another way to increase the strength is to increase the size of the key. Since the contents of the key remain secret, increasing the size adds another level of difficulty for anyone trying to deduce what transformations may have been performed on the original data, because they are unlikely to guess the random number combination making up the key. Yet another way to increase algorithm strength is to increase the size of the "block" on which the cipher performs its transformations. A block is the unit of original data processed during one ciphering operation. The larger the block size, the more difficult it becomes for an adversary to construct a dictionary of plaintext and matching ciphertext, for a given key, large enough to pose a threat to the security of the algorithm. Further, different keys (i.e., subkeys) can be used for each round, increasing the number of random number combinations that would have to be correctly guessed in order to break the cipher.

It will be appreciated that when a cipher allows varying the number of rounds, the key size, the key values, and the block size at the same time, an incredibly difficult challenge is presented to a person attempting to discover the original data contents from an encrypted result. It will also be appreciated that the computations involved to cipher the data are quite complex, and that while performing more rounds of ciphering increases the strength of the result, it also causes computation time to increase. When data is very sensitive, this time spent in ciphering will be warranted. It may be, however, that less sensitive data does not warrant the added time and expense of many rounds of ciphering. By providing an algorithm where the number of rounds, the key size and values, and the block size are variable, the ultimate choice between the level of security required and the amount of computation time utilized rests with the user. By allowing the number of rounds per stage, key size, and block size to vary, the cipher of the present invention becomes, in effect, scalable in three dimensions.

Existing symmetric key block ciphers may provide for variation in the key size, the block size, and the number of rounds of ciphering, but these ciphers define a single type of round function, and iterate that function repeatedly. Existing ciphers tend to avoid use of data-dependent rotations, because reading the rotation amount from the storage location or register holding the data value is computationally very expensive. Further, use of S-boxes in existing ciphers tends to be inefficient, because subkeys are used as indices to access the S-boxes.

Accordingly, a need exists for an improved and more flexible symmetric block cipher which offers excellent resistance to linear and differential attacks; operates quickly and efficiently while using S-boxes; uses data-dependent rotation in a fast, efficient round function; and supports a variable length key, variable length block, and a variable number of rounds per stage.

The technique of the present invention achieves these objectives by using multiple stages while using the fast operations of table lookup, exclusive OR, addition, subtraction, and data-dependent rotation, thereby minimizing the time required to encrypt and decrypt data. Data-dependent rotation is fast because of a novel manner of locating the data value in a single, predetermined register. Table lookup using S-boxes is made faster because some rounds access the S-boxes without using subkeys. The data-independent sub-keys can be precomputed, further minimizing the time required for encryption and decryption. A minimal amount of computer storage is required for data used in the operation of the cipher.

SUMMARY OF THE INVENTION

An object of the present invention is to provide a technique whereby data can be encrypted in such a manner as to make discovery of the underlying data contents, other than by use of the corresponding decryption technique, computationally infeasible.

Another object of the present invention is to provide a technique whereby encryption is accomplished using a symmetric key block cipher with a strength better than that of existing symmetric block ciphers, with significantly improved efficiency.

Another object of the present invention is to provide a solution that does not use a significant amount of computer storage, in order to maximize the number of environments in which the solution can be used, including limited-storage devices such as those known as "Smart Cards".

Another object of the present invention is to provide a technique whereby decryption of the encrypted data restores the data to its original contents, in an efficient and error-free manner.

Another object of the present invention is to provide a solution that can be implemented in hardware or in software.

Another object of the present invention is to provide a solution that allows precomputing the subkeys to be used for each round of ciphering, in order to minimize the time required for encrypting or decrypting an individual file or message.

Still another object of the present invention is to provide a technique whereby the cipher used for encryption and decryption uses multiple stages, where the stages have different structures and different subround functions. This use of differing structures makes the cipher much more resistant to attack, because an attack that is successful against one structure must then be successful against the next structure as well—which is incredibly difficult to accomplish. Thus, any weakness that exists in one of the structures will be cancelled out by the other structure(s).

A further object of the present invention is to provide a technique whereby the cipher uses a variable number of rounds per stage of processing during encryption and decryption, a variable length block of data as the unit to be encrypted and decrypted, and a variable length key. Allowing these factors to vary will provide the user with choices that will not only affect execution time and strength of security for any given use of the cipher, but will also allow variation between subsequent uses of the cipher, further increasing the difficulty of breaking encrypted data from a given source. The variation capability makes the cipher scalable in three dimensions, providing the user with flexibility to tune the algorithm to achieve the proper trade-off between execution time required and security achieved, in order to meet the needs of his particular application.

Yet another object of the present invention is to provide a technique whereby particular values for the variable information used by the algorithm—i.e., key length, block length, and number of rounds per stage—can be factored into the software or hardware implementation, as fixed values, in order to optimize performance.

This invention describes a novel Feistel based symmetric block cipher, using a hybrid structure where use of multiple stages provides both Type-1 and Type-3 rounds, and using different subround functions in different stages. By using several stages, each with rounds having different structure and functions, the overall cipher can provide a better combination of attributes than a cipher based on a single structure and round function.

In the preferred embodiment, this design divides the encryption operation into five stages. In the first and fifth stages, a single round is performed, in which a word of subkey data is added to each of the input data words. These first and last stages provide some resistance to chosen plaintext attacks. The second and fourth stages each consist of two full Type-3 Feistel rounds of (unkeyed) S-box based mixing, using two "8×32" S-boxes, each with 256 entries of 4-byte values. ("8×32" refers to the fact that the S-box takes an 8-bit input, and returns a 32-bit output.) These stages provide rapid mixing to offer resistance to differential attacks. By keeping these rounds unkeyed, the performance penalty of S-box operations is minimized, while still providing good differential properties.

In the preferred embodiment, the middle (third) stage consists of sixteen full rounds of Type-1 Feistel, each with four subrounds based on a novel method using keyed data-dependent rotations. This stage provides the bulk of the keyed non-linearity, with very fast rounds. A single, predefined register is used to specify the amount of rotation, thus eliminating the performance penalty associated with existing implementations of data-dependent rotation.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a technique, system, and method for implementing a symmetric key block cipher supporting a plurality of stages, a variable length input key, a variable length block, and a variable number of rounds in each of the stages, and where the stages have differing structures and a plurality of subrounds in the rounds have differing subround functions, comprising a subprocess for accessing and retrieving values in two substitution boxes (S-boxes); a subprocess for generating a plurality of subkeys using the input key and a pseudorandom function; a subprocess for encrypting a plurality of input data words of a plurality of input data blocks of an input data file using the S-boxes and a plurality of the generated subkeys, producing a corresponding plurality of encrypted data words of a plurality of encrypted data blocks of an encrypted data file. The subprocess for encrypting comprises a first set of stages, wherein at least one of the structures comprises a Type-3 Feistel network, and at least one of the structures comprises a Type-1 Feistel network. The cipher further comprises a subprocess for decrypting each of the encrypted data words using the S-boxes and the plurality of generated subkeys, resulting in restoration of the plurality of input data words. The subprocess for decrypting comprises a second set of stages, wherein at least one of the structures comprises an inverse of the Type-3 Feistel network and at least one of the structures comprises an inverse of the Type-1 Feistel network. Preferably, each set of stages is comprised of five stages, where the first stage for encryption comprises a subprocess for performing addition using subkeys; the second stage comprises a subprocess for performing unkeyed Feistel Type-3 mixing using the S-boxes; the third stage comprises a subprocess for performing a Feistel Type-1 data-dependent rotation using subkeys; the fourth stage comprises a subprocess for performing a second unkeyed Feistel Type-3 mixing using the S-boxes; and the fifth stage comprises a subprocess for performing addition using subkeys. The stages for decryption are these inverse of these encryption stages. Preferably, the first and fifth stages comprise a single round; the second and fourth stages comprise two rounds, and the third stage comprises sixteen rounds. The subround operations preferably are taken from the set comprising table lookup using said S-boxes, exclusive OR, addition (with subtraction as an inverse), and data-dependent rotation. The table lookup operation is preferably performed without use of subkeys. A data-dependent rotation operation preferably places a value specifying an amount of rotation in a single register, where that register is used when performing the rotation. Optionally, the cipher implementation may be optimized by having values entered before a final production of the code, to fix one or more of the variables supported. One or more of the subprocesses may be embodied in a hardware chip.

The present invention will now be described with reference to the following drawings, in which like reference numbers denote the same element throughout.

BRIEF DESCRIPTION OF THE DRAWINGS

FIGS. 7A and 7B show an example of substitution boxes that may be used with the present invention.

DESCRIPTION OF THE PREFERRED EMBODIMENT

Figure 1:
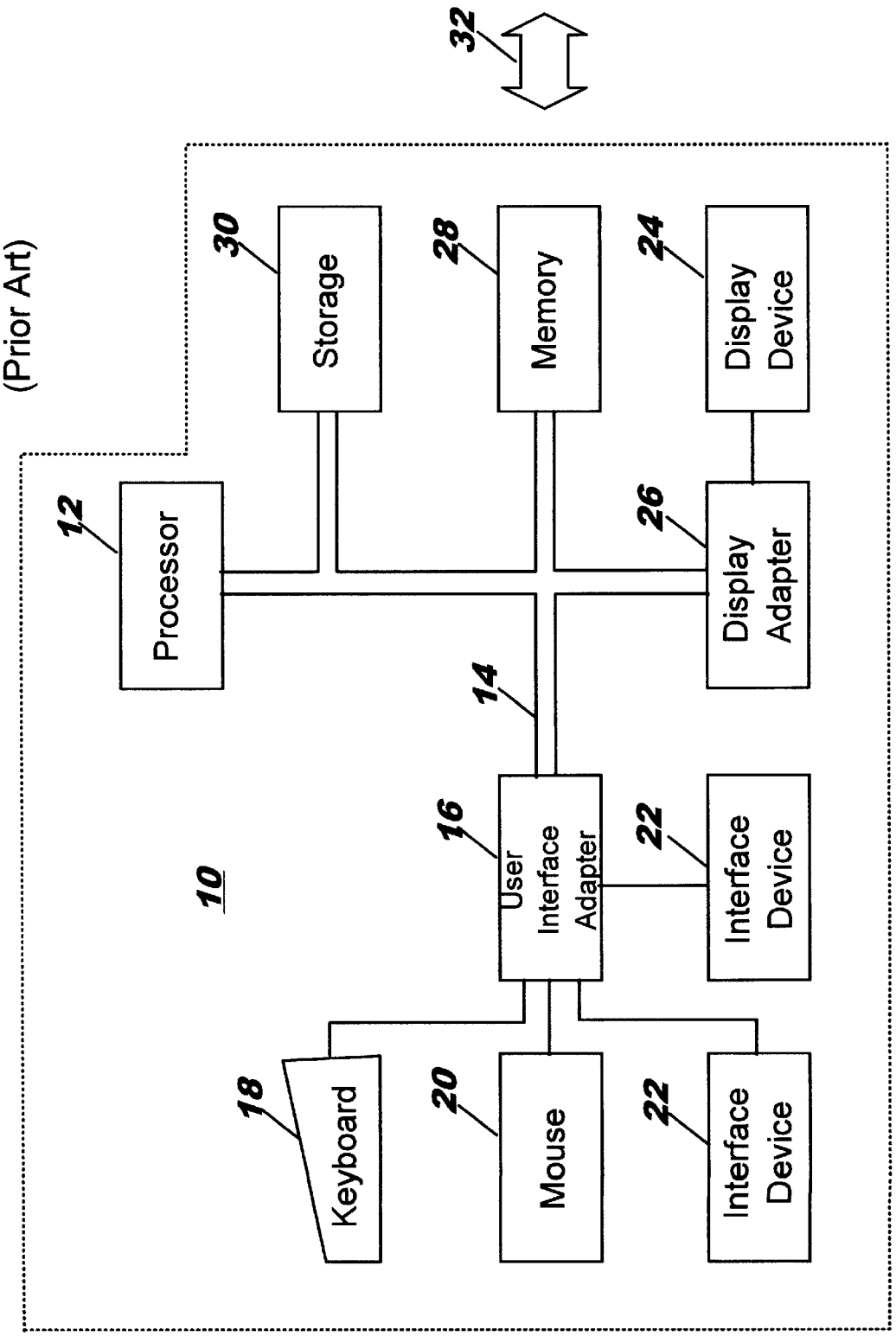
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
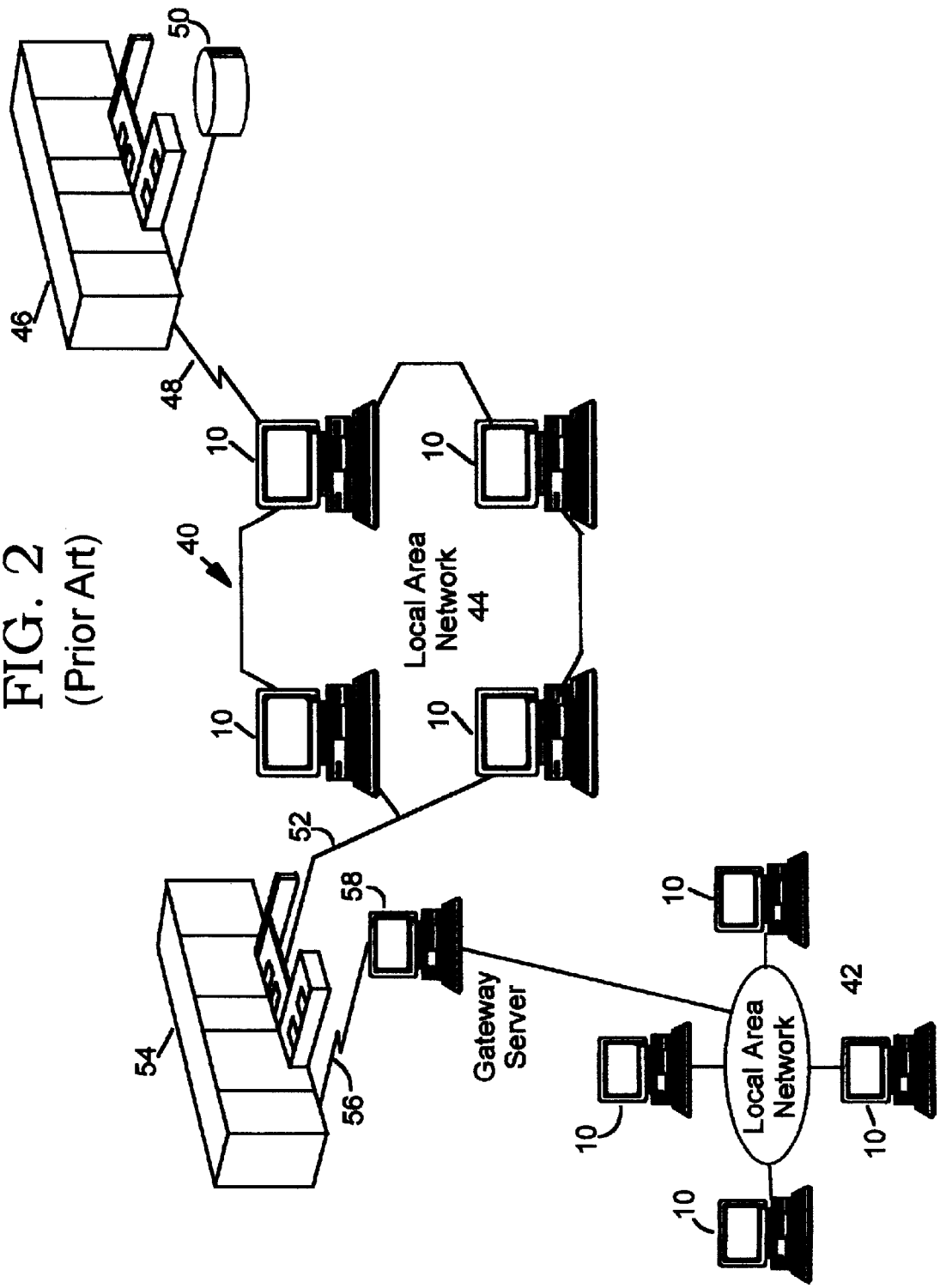
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The encrypted data resulting from use of the present invention may be stored on any of the various media types used by the long-term storage 30, or may be sent from the workstation 10 to another computer or workstation of the network illustrated in FIG. 2 over the communications channel 32, for storage by that other computer or workstation. The encrypted data may be decrypted at the same computer or workstation where it was encrypted, or it may be decrypted at a different computer or workstation.

In a hardware solution, the present invention may be embodied in the processor 12 of the workstation 10. Techniques for implementing logic functions in processors are well known in the art.

The preferred embodiment of the present invention will now be discussed with reference to FIGS. 3 through 7.

In the preferred embodiment, the present invention is implemented as a computer software program. This software performs the derivation of subkeys from an input key for use during the rounds of the cipher, the encrypting of the data contents, and the decrypting of the data contents. The data may represent a message to be communicated over a network. The message may represent any of a number of types of information, such as conversational text sent as electronic mail, or a purchase request containing the buyer's credit card or account data. Alternatively, the data may be a conventional data file. Examples of this type of data include patient medical history, customer credit history, income tax and earnings data, and any conceivable stored information that needs to be protected from unintended disclosure. This type of data may be encrypted for transmission over a network, or it may be encrypted merely for secure storage. For ease of reference, the input data file or message will be referred to herein as an "input file".

The present invention encrypts and subsequently decrypts the data using a symmetric key block-oriented cipher. The concepts of block-oriented ciphers and symmetric keys are well known in the art.

The present invention also provides a technique for using variable block sizes, variable key sizes, and a variable number of rounds of cipher processing per stage. The purpose of allowing these variables is to give the user of the cipher the flexibility to choose trade-offs between the increased computing time required (for example, as the number of processing rounds increases) and the strength of the resulting encryption.

Optionally, the present invention allows the software or hardware implementation of the cipher algorithm to be optimized for particular values of the variables. This is done by allowing a user of the cipher to enter values for block size, key size, and/or number of rounds per stage before the final step of producing the cipher implementation. The final implementation then treats the values as being fixed, and is optimized for those fixed values.

Decryption of data is accomplished in the present invention using the inverse of the data encryption, where the stages used for encryption are performed in reverse order, and the operations performed in each stage are inverted. By performing inverse processing, in inverse order, the encrypted data is restored to its original content.

The inventive concepts of the present invention define a general approach which can be used with data blocks and keys of differing sizes, and with varying number of rounds per stage. For the description of the preferred embodiment, specific values will be used to facilitate description of the processing, although the same methods can be applied with other values. The descriptions will all use "C" programming language syntax. (Standard "C" language coding has been used, except where indicated by the phrase "pseudo-code". Refer to any "C" language programming manual for an explanation of the syntax used in the "C" language statements.)

Specific functions are shown for each of the round functions in the 5 stages of the preferred embodiment. However, changes may be made to those round functions without deviating from the inventive concepts of the present invention.

For this description of the design, the variables w, k, d, r1, r2, and n have the following definitions, and are described using the following values:

w number of bits per word=32,
k=number of words in the key=4, (for a 128-bit key)
d=number of words in the data block=4, (for a 128-bit block)
r1=number of rounds in each mixing stage=2,
r2=number of rounds in the center stage=16, and
n=number of words in the expanded key array=d * (r2+2).
Arrays K[k], D[d], E[n], S0[256], and S1[256] are defined as follows:

K[k] is the key (an array of k w-bit words),
D[d] is the data (an array of d w-bit words),
E[n] is the expanded key (an array of n w-bit words),
S1[256] is S-box 0 (an array of 256 w-bit words), and
S1[256] is S-box 1 (an array of 256 w-bit words). (FIGS. 7A and 7B show possible examples of S0 and S1 that were randomly generated. Other values may be used instead of those shown, without deviating from the inventive concepts of the present invention.)

The cipher uses two rotation functions, which are defined as follows:
ROTATE (x, y, w) rotates the w-bit word x by (y mod w) locations to the left;
IROTATE (x, y, w) rotates the w-bit word x by (y mod w) locations to the right.

The cipher has three major component functions: key setup, encryption, and decryption.

Note that the processes shown for the stages do not show a user entering particular values to be used for the variables (defining the block size, key size, and number of rounds per stage), nor a value to be used for the key. The user will have been prompted to enter these values upon invoking the cipher function, or the values will be read from a file. Alternatively, if an optimized implementation of the cipher is being used, the user will have been prompted to enter one or more of these values before the final step of producing the cipher implementation (e.g. compiling the cipher code) has been completed. Techniques for entering values required by an implementation are well known in the art.

Key Setup Phase

Subkeys are generated using an input key. A user of the invention may be prompted, for example from a computer terminal, to enter the input key. Alternatively, the input key could be read from a file stored on disk, or passed as a parameter to a computer program embodying the present invention. The key setup phase may be performed immediately prior to the encryption phase when encrypting a particular input file, or the subkeys may be generated well in advance of the encryption. In the latter case, the subkeys would be stored for later use, in order to minimize the time required to encrypt a data file. Regardless of when the subkeys are generated, the generation process follows the same steps.

An expansion process is performed on the input key, to create an expanded key array (as previously defined). Expanding the input key in this manner allows greater randomness for the subkeys used during the encryption rounds, without requiring a key of very large size to be input to the cipher. For example, in the preferred embodiment, the input key is 128 bits long (4 words, each having 32 bits), whereas the expanded key is 2304 bits long (using the formulas defined above, 72 words each having 32 bits). The entries in this expanded key array are then used as subkeys in the key-dependent rounds of encryption, and the corresponding rounds of decryption. Techniques for key expansion are well known in the art. The following is one way of expanding keys for use with the present invention.

Key setup is performed by filling the expanded key array with values generated using iterated pseudorandom functions that use a counter, i, and the input key K as parameters, as specified with the following pseudo-code:

for (i=0; i<n; i++)
E[i]=PRF (i, K);

where PRF is some pseudorandom function using the concatenation of input parameters i and K, returning a word. It will be understood by one skilled in the art that this pseudo-code indicates that the value used for the counter begins at zero; increases by one for each iteration; and that the iterative process is repeated for each value from zero up through and including the value (n−1). Thus, a value is assigned to each of the n words of the expanded key array. Alternatively, a pseudorandom function may be used that returns more than one word. In that situation, the pseudo-code would need to be changed. The following example assumes a different pseudorandom function, referred to as PRF1, which uses the concatenation of input parameters i and K, and returns a value of size x:

```
for (i = 0; i < n; i += x)    {
    temp = PRF1 (i, K);        /* where temp is an array of size x */
    for (j = 0; j < x; j++)
        F [i + j] = temp [j];    }
```

In the preferred embodiment, the pseudorandom function is the secure hashing function commonly referred to as "SHA-1". This hashing function is defined in NIST FIPS 180-1, titled "Secure Hash Standard". The SHA-1 function returns a 5-word result each time it is invoked. For this function, and any other pseudorandom function which returns more than one word, the preferred embodiment key setup phase "tiles" the output values into the expanded key array, as indicated by the pseudo-code shown above using PRF1. That is, the multi-word output is used as multiple sequential array elements, following the sequential group of elements created from the prior invocation of the pseudo-random function. For example, the value returned from the first invocation of SHA-1 is used as elements E[0] through E[4], the value returned from the second invocation is used as elements E[5] through E[9], etc. When the pseudorandom function returns more than one word, the preferred embodiment discards any unneeded words from the end of the returned value that exceed the dimension of the expanded key array. Using the dimensions given previously as values for describing the preferred embodiment, the expanded key array has 72 words. Since this is not a multiple of 5, only the first 2 words of the final invocation are used.

Encryption Phase

Figure 3:
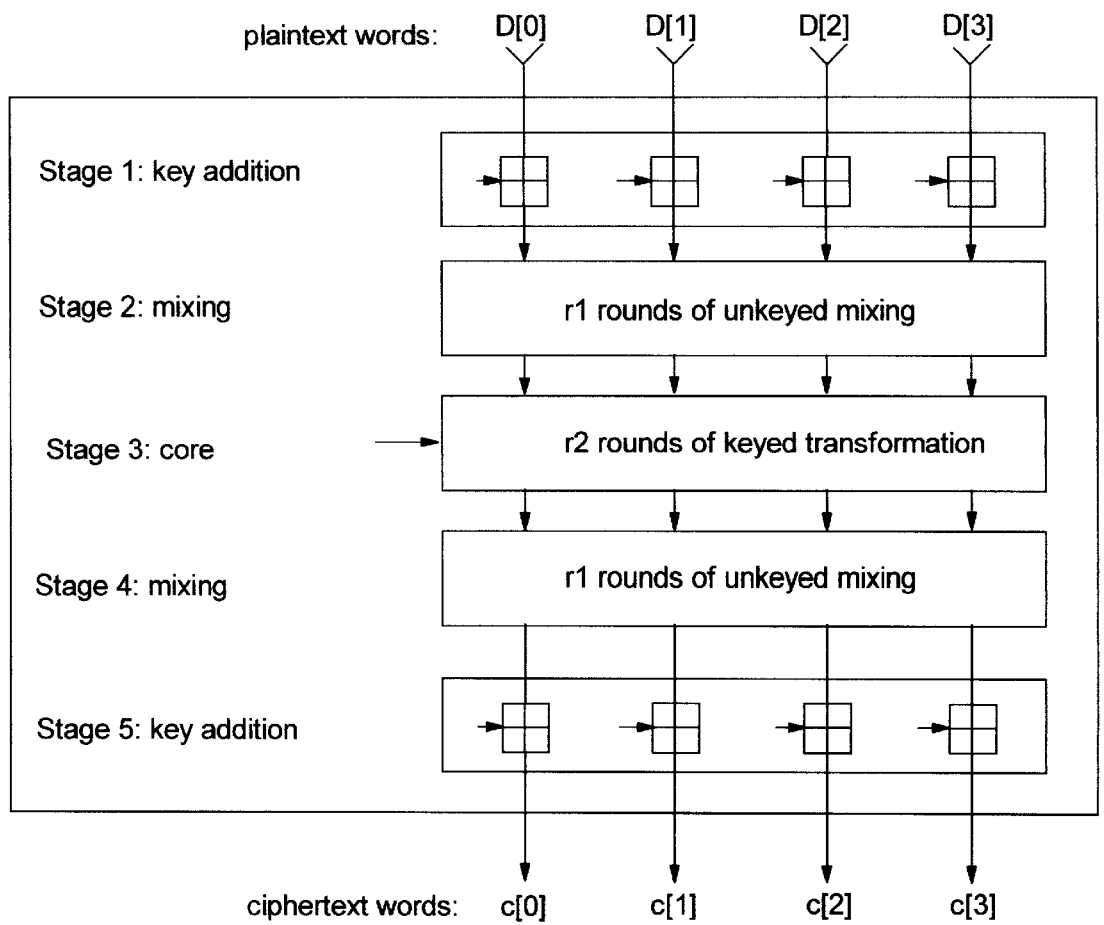
FIG. 3 illustrates the stages of operation used by the present invention for encrypting a block of plaintext into a block of ciphertext.

Encryption is performed in multiple stages. According to the preferred embodiment, five stages are used, as diagramed in FIG. 3. Each of these five stages is performed for each input block of plaintext. FIG. 3 shows that from the plaintext words (referred to as D[0] through D[3] in FIG. 3), application of the five stages creates the output block of ciphertext (referred to as c[0] through c[3] in FIG. 3). As previously stated, the number of words per block used by the present invention is variable: four-word blocks are shown in FIG. 3 as an illustrative block size.

While the preferred embodiment is described using five stages, more stages may be added without deviating from the inventive concepts of the present invention. For example, the operations of Stage 1 could be repeated following operation of Stage 2, and the operation of Stage 5 could be performed prior to operation of Stage 4 as well as after Stage 4.

The stages of the preferred embodiment are described using a general approach to subkey usage, whereby subkeys are accessed in sequential groups. Alternative approaches to selecting subkeys may be used without deviating from the inventive concepts of the present invention. For example, instead of using each subkey sequentially within a group, an index might be used to cause selection of every other subkey, or every third subkey, or perhaps generating an index number randomly. When the subkeys are chosen from a greater range of indices in this manner, then the size of the subkey group used will need to expand accordingly; or, the group size might be retained, with the subkeys within that group being re-used. The description of the encryption stages gives more detail about how subkey selection might be altered to fit within the approach defined for that stage. It will be obvious to one of ordinary skill in the art that any such alterations to the preferred embodiment subkey selection for encryption must be reflected also in the decryption stages.

Each of the five stages of the preferred embodiment will now be described in detail.

Encryption Stages 1 and 5

Stages 1 and 5 of the preferred embodiment consist of simply adding one subkey word to each of the data words, which in "C" code can be specified as:

```
/* Stage 1: add subkeys to all data words */
for (j = 0; j < d; j++)
    D[j] += E[j];
/* Stage 5: add subkeys to all data words */
for (j = 0; j < d; j++)
    D[j] += E[d * (r2 + 1) + j];
```

As will be understood by one skilled in the art, the result of the "C" code for stage 1 is to iterate d times, where d is the number of words in each block, using an iteration counter, j. The d iterations together comprise the single round of Stage 1 processing of the preferred embodiment. Each word D[0] through D[d−1] from the data block has the corresponding word E[0] through E[d−1] from the expanded key array added to it. The result of this addition is then used as the new value of the data block word D[0] through D[d−1]. When 4-word blocks are used, the first 4 subkeys (elements E[0] through E[3]) are used each time the Stage 1 process is performed.

The result of the "C" code for stage 5 is also to iterate d times, using an iteration counter j. These d iterations comprise the single round of Stage 5 processing of the preferred embodiment. Each word D[0] through D[d−1] from the data block has the corresponding word E[d*(r2+1)] through E[(d * (r2+1))+d−1] from the expanded key array added to it. The result of this addition is then used as the new value of the data block word D[0] through D[d−1]. When 4-word blocks are used, the last 4 subkeys (elements E[n−3] through E[n]) are used each time the Stage 5 process is performed.

While the preferred embodiment of Stages 1 and 5 uses 1 round (having d subrounds), the number of rounds can be increased without deviating from the inventive concepts of the present invention. For example, another round of subkey addition could be performed, using a different group of subkeys.

Subkey selection for Stages 1 and 5 might be altered to use different subkeys. Instead of using j as an index into the subkey array, Stage 1 might use (2*j), or (3*j), etc. If a sufficiently large value is used, then the computation needs to ensure that indices beyond the maximum size of the expanded key array are adjusted, to select a subkey within the proper range. For example, if the computation result is described as some value "x", then the index [x mod (d*(r2+

2))] will ensure that x is a valid index for the expanded key array. Since Decryption Stage 5 uses the same subkeys used by Encryption Stage 1, in the same order, any changes made to the selection computation need to be factored into the decryption computations as well. For example, if (2*j) is used in encryption, then (2*j) is used in decryption to select those same subkeys.

As shown in FIG. 3, the new data block created by operation of Stage 1 becomes the input to Stage 2. The input to Stage 5 comes from the output of Stage 4, and the output of Stage 5 is used as the resulting ciphertext block for the block of data being encrypted.

Encryption Stages 2 and 4

Stages 2 and 4 each perform an unkeyed Type-3 Feistel mixing, each using r1 rounds of mixing. In the preferred embodiment, r1=2. For each round of mixing, each subround consists of taking one of the data words, and using each of its bytes as an index into an S-box, then taking the word in that S-box entry, and either adding or exclusive OR'ing it into one of the other data words. Each full round consists of doing d such subrounds, where each subround uses a different data word as source.

Between the subrounds, 2 simple feedback addition or subtraction operations are added. This provides some of the strength of a full round, without the expense.

In the preferred embodiment, each data word has 4 bytes, and each round has 4 subrounds. A diagram of a full Stage 2 mixing round using 4-byte data words and 4 subrounds is given in FIG. 4, and a full Stage 4 mixing round is shown in FIG. 5. In "C" code, Stages 2 and 4 can be specified as:

```
/* Stage 2: for each of r1 mixing rounds. . . */
for(i = 0;i < r1;i++) {
    /* Data word D[0] is used to mix D[1], D[2], D[3]*/
    mixSubRound (D, 0, 1, 2, 3);
    D[0] += D[3];
    /* Data word D[1] is used to mix D[2], D[3], D[0]*/
    mixSubRound (D, 1, 2, 3, 0);
    D[1] += D[2];
    /* Data word D[2] is used to mix D[3], D[0], D[1]*/
    mixSubRound (D, 2, 3, 0, 1);
    /* Data word D[3] is used to mix D[0], D[1], D[2]*/
    mixSubRound (D, 3, 0, 1, 2);
}
/* Stage 4: for each of r1 inverse mixing rounds. . . */
for(i = 0;i < r1;i++) {
    /* Data word D[3] is used to inversely mix D[0], D[1], D[2]*/
    inverseMixSubRound (D, 3, 0, 1, 2);
    /* Data word D[2]is used to inversely mix D[3], D[0], D[1]*/
    inverseMixSubRound (D, 2, 3, 0, 1);
    D[1] -= D[2];
    /* Data word D[1] is used to inversely mix D[2], D[3], D[0]*/
    inverseMixSubRound (D, 1, 2, 3, 0);
    D[0] -= D[3];
    /* Data word D[0]is used to inversely mix D[1], D[2], D[3]*/
    inverseMixSubRound (D, 0, 1, 2, 3);
}
```

As can be seen from these "C" language statements, Stage 2 and Stage 4 are very similar, but with a different ordering. There are many ways in which ordering could be changed without deviating from the inventive concepts of the present invention: the preferred embodiment shows one example, which is to use inversion.

The function "mixSubRound", used for each of the four subrounds of Stage 2 as shown above, is specified in "C" code as:

```
/* Data word D[src] is used to mix D[dst1], D[dst2], D[dst3].
* Each byte of D[src] is used as an index into an S-box, taking the
* output word, and adding or exclusive OR'ing it into one of the other
* three data words. Two S-boxes are used to avoid cancellations.
* Notice that at the end of this subround, the D[src] data word is rotated
* 24 locations to the left.
*/
mixSubRound(WORD D[ ], int src, dst1, dst2, dst3)
{
    D[dst1] ^= S0 [D[src] &255];
    D[src] = ROTATE (D[src], 8, w);
    D[dst1] += S1 [D[src] &255];
    D[src] = ROTATE (D[src], 8, w);
    D[dst2] += S0 [D[src] &255];
    D[src] = ROTATE (D[src], 8, w);
    D[dst3] ^= S1 [D[src] &255];
}
```

The function "inverseMixSubRound", used for each of the four subrounds of Stage 4 as shown above, is specified in "C" code as:

```
/* Data word D[src] is used to inversely mix D[dst1], D[dst2], D[dst3].
* Each byte of D[src] is used as an index into an S-box, taking the
* output word, and subtracting or exclusive OR'ing it into one of the other
* three data words. Two S-boxes are used to avoid cancellations.
* Notice that at the end of this subround, the D[src] data word is rotated
* 24 locations to the right.
*/
inverseMixSubRound(WORD D[ ], int src, dst1, dst2, dst3)
{
    D[dst3] ^= S1[D[src] &255];
    D[src] IROTATE (D[src], 8, w);
    D[dst2] -= S0 [D[src] &255];
    D[src] = IROTATE (D[src], 8, w);
    D[dst1] -= S1 [D[src] &255];
    D[src] = IROTATE (D[src], 8, w);
    D[dst1] ^= S0[D[src] &255];
}
```

Figure 4:
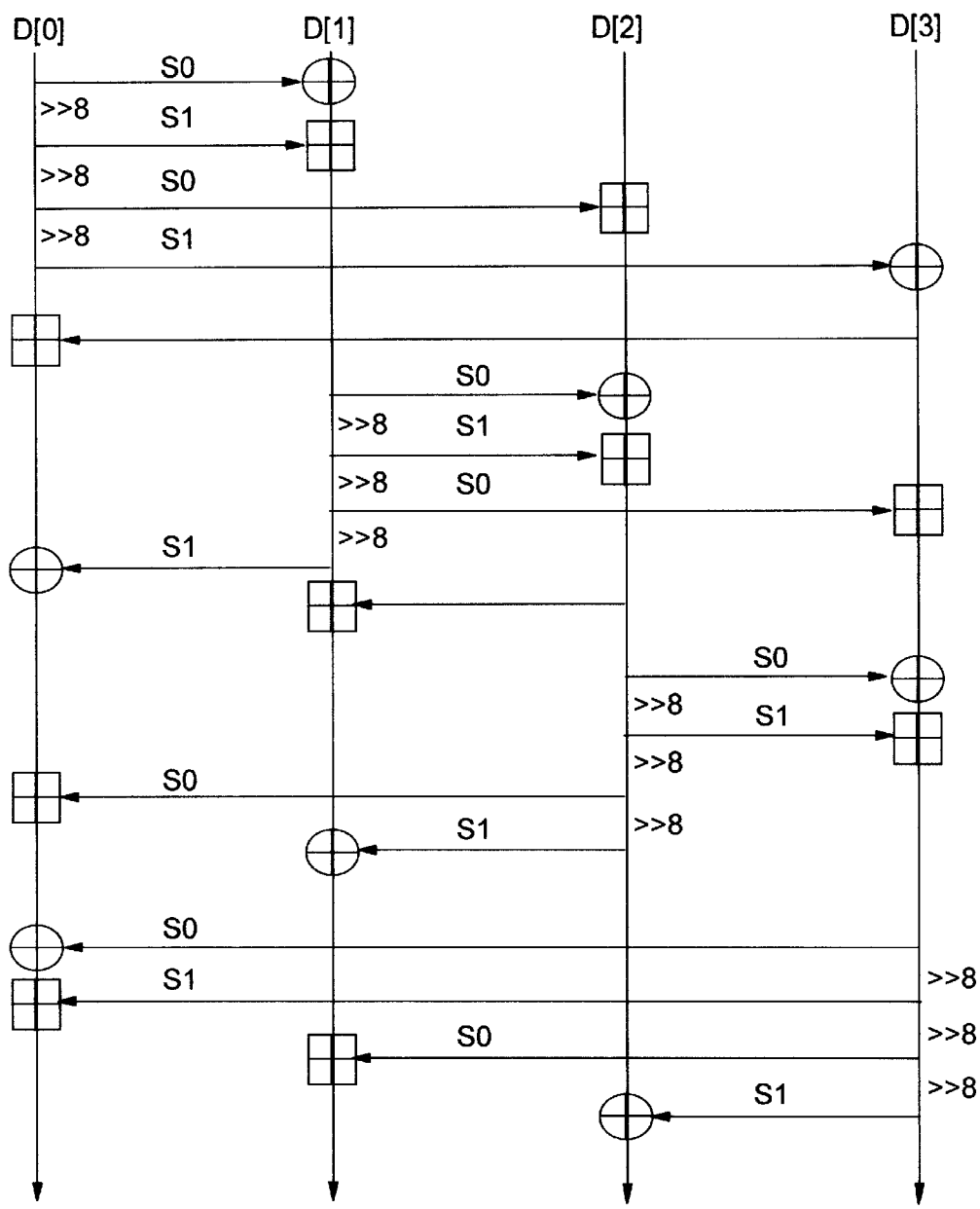
FIG. 4 shows a flow diagram of the process used during Stage 2 of the preferred embodiment of the present invention, to complete a round of encryption.
Figure 5:
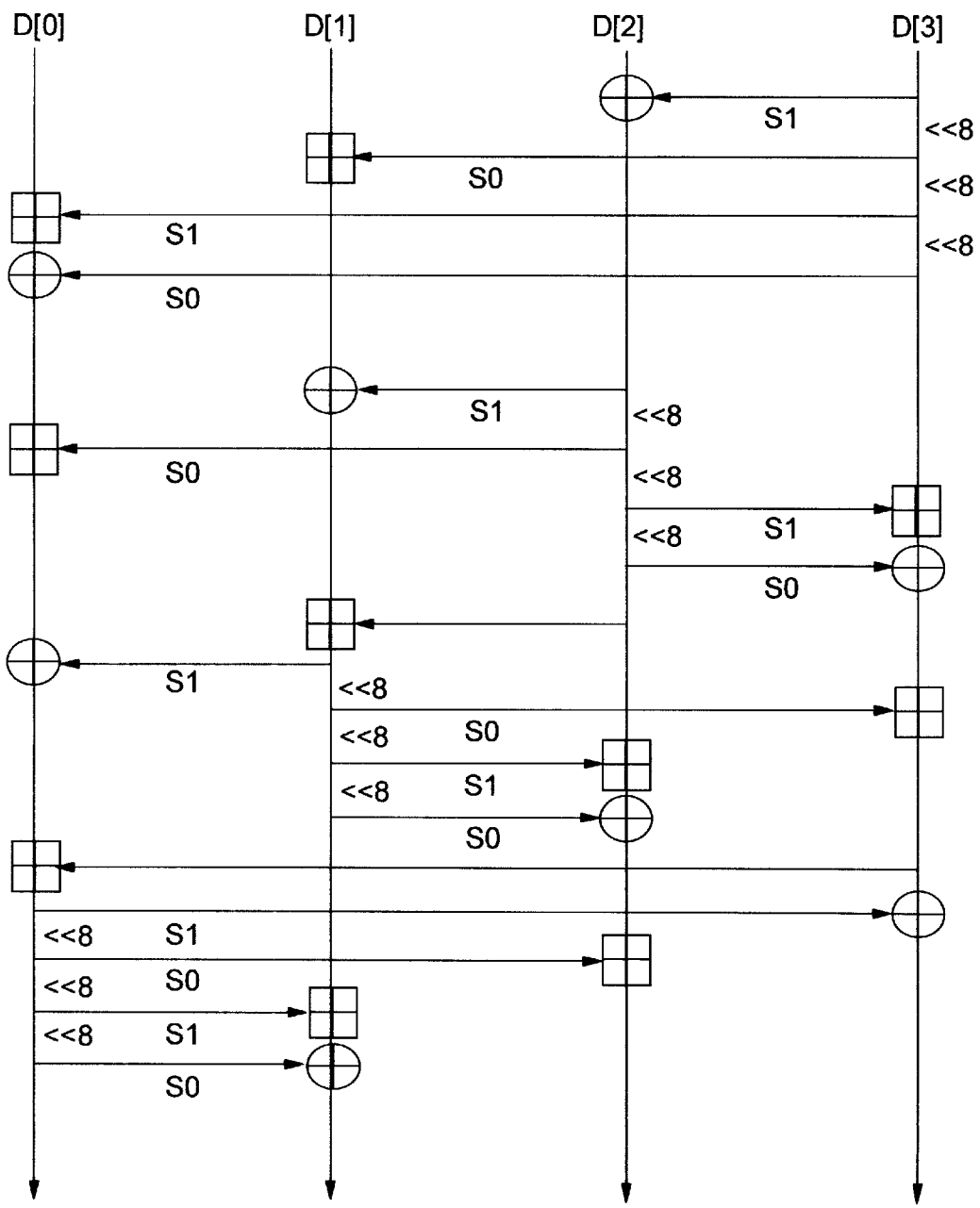
FIG. 5 shows a flow diagram of the process used during Stage 4 to complete a round of encryption.
Figure 5:

As will be understood by one skilled in the art, the processing of Stage 2 as defined by the above "C" language statements (and as shown in FIG. 4) performs one subround for each data word of the data block. Four subrounds are shown, for the example where each data block has 4 data words. The first subround mixes word D[0]; the second subround mixes D[1]; the third subround mixes D[2]; and the fourth subround mixes D[3].

As an example of the operation of the subround function, consider the first subround of Stage 2, using data blocks which have 4 data words each. This first subround invokes the mixing function using the parameters (D, 0, 1, 2, 3), as shown above. The first operation of the mixing function "mixSubRound", shown as the first line of "C" code, masks off all but the low-order 8 bits of D[0], by performing an AND operation where the two operands are D[0] and 255. Thus, the last byte of D[0] is isolated from the other bytes. The value in this byte is then used as the 8-bit index into S-box zero. A 32-bit value is retrieved as a result of this index operation. That 32-bit value is exclusive OR'd with the 32-bit value in D[1]. The result of this exclusive OR operation becomes the new value of D[1]. The second operation of the mixing function, shown as the second line of "C" code, rotates D[0] 8 positions to the left. The third operation of the mixing function, shown as the third line of "C" code, uses this rotated D[0] and again masks off all but the low-order 8 bits. Because of the prior rotation, a different byte of D[0] is now isolated by this masking operation. That byte is used as an index into S-box one. The 32-bit value retrieved is added to the value of D[1], and the result becomes the new value of D[1]. In the fourth operation, D[0] is again rotated 8 positions to the left, so that the fifth operation will isolate a different byte. In the fifth operation, the low-order byte from D[0] is used to index into S-box zero, and the value retrieved is added to D[2], forming the new value for D[2]. In the sixth operation, D[0] is rotated a final time, so that the remaining unused byte rotates into the low-order 8 bits. The seventh operation isolates this byte, and uses it to index into S-box one. The retrieved value is then exclusive OR'd with D[3], forming a new value for D[3]. Invocation of mixSubRound is then complete, and control returns to the main processing routine of Stage 2. As seen in the "C" code, after returning to the main processing, the value now stored in D[3] is added to the value in D[0]as the first-described feedback operation, forming a new value for D[0].

The other three subrounds of processing in Stage 2 are analogous to the first, with two exceptions. First, the data words are passed as parameters in different orders in each subround, as indicated. Second, an addition operation is used for feedback following the first and second invocations of mixSubRound (as shown in the "C" code and described above for subround 1), but no such addition operation is used following the third or fourth invocations.

It will be obvious to one skilled in the art how to change the definition and invocation of mixSubRound if blocks of different size, or data words of different size, are used. For example, if blocks of 8 words were used (instead of blocks of 4 words), mixSubRound would be invoked 8 times. (In other words, there would be 8 subrounds, each subround comprising an invocation of the mixing function.) The value passed as the parameter designated "src" would typically begin at 0, and proceed sequentially through 7. The parameters designated "dst1", "dst2", and "dst3" could be left as they are, passing various combinations of the values between 0 and 3. Alternatively, each invocation could use 3 parameters chosen from the range 0 through 7 (and chosen to be distinct from the value used for "src"), meaning that each of the 8 words is being used in transformation, but not to transform every one of the seven other words. Or, mixSubRound could be redefined to accept more parameters. If it was desired to use all 8 words to mix every other word, then 4 more parameters would be added to the definition of (and to each invocation of) mixSubRound, so that all 8 words were passed on each invocation, in varying order. Additional statements would need to be added to mixSubRound to use the additional parameters. For example, each exclusive OR and each addition operation might be replaced by two such operations, while still using 4 retrieved S-box values, so that each retrieved value was factored into 2 different parameters. Or, the rotation operations could be changed to use 4 bit positions, giving 8 different values to use for indexing the S-boxes. Then, a different retrieved value could be used in each of 8 exclusive OR or addition operations, each operation being performed on a different parameter.

As will be understood by one skilled in the art, the processing of Encryption Stage 4 as defined by the above "C" language statements performs one subround for each data word of the data block. Four subrounds are shown, for the example where each data block has 4 data words. The first subround inversely mixes word D[3]; the second subround inversely mixes D[2]; the third subround inversely mixes D[1]; and the fourth subround inversely mixes D[0].

As stated previously, the operation of Stage 4 is similar to that of Stage 2, except that a different ordering is used. In the preferred embodiment, inversion is used. Therefore, 2 subtraction operations are used as the 2 feedback operations between rounds, instead of 2 addition operations. The function "inverseMixSubRound" rotates values to the right, instead of to the left, and replaces the addition operations of "mixSubRound" with subtraction.

As an example of the operation of the subround function during Stage 4, consider the first subround, using data blocks which have 4 data words each. This first subround invokes the inverse mixing function using the parameters (D, 3, 0, 1, 2), as shown above. The first operation of the inverse mixing function "inverseMixSubRound", shown as the first line of "C" code, masks off all but the low-order 8 bits of D[3], by performing an AND operation where the two operands are D[3] and 255. Thus, the last byte of D[3] is isolated from the other bytes. The value in this byte is then used as the 8-bit index into S-box one. A 32-bit value is retrieved as a result of this index operation. That 32-bit value is exclusive OR'd with the 32-bit value in D[2]. The result of this exclusive OR operation becomes the new value of D[2]. The second operation of the inverse mixing function, shown as the second line of "C" code, uses the function IROTATE to rotate D[3] 8 positions to the right. The third operation of the inverse mixing function, shown as the third line of "C" code, uses this rotated D[3] and again masks off all but the low-order 8 bits. Because of the prior rotation, a different byte of D[3] is now isolated by this masking operation. That byte is used as an index into S-box zero. The 32-bit value retrieved is subtracted from the value of D[1], and the result becomes the new value of D[1]. In the fourth operation, D[3] is again rotated 8 positions to the right, so that the fifth operation will isolate a different byte. In the fifth operation, the low-order byte from D[3] is used to index into S-box one, and the value retrieved is subtracted from D[0], forming the new value for D[0]. In the sixth operation, D[3] is rotated a final time, so that the remaining unused byte rotates into the low-order 8 bits. The seventh operation isolates this byte, and uses it to index into S-box zero. The retrieved value is then exclusive OR'd with D[0], forming a new value for D[0]. Invocation of inverseMixSubRound is then complete, and control returns to the main processing routine of Stage 4.

The other three subrounds of processing in Stage 4 are analogous to the first, with two exceptions. First, the data words are passed as parameters in different orders in each subround, as indicated. Second, a subtraction operation is used as a feedback operation following the second and third invocations of inverseMixSubRound (as shown in the "C" code), but no such subtraction operation is used following the first or fourth invocations.

It will be obvious to one skilled in the art how to change the definition and invocation of inverseMixSubRound if blocks of different size, or data words of different size, are used. It will also be obvious that if the definition and invocation of mixSubRound is changed for Stage 2, as described above, then corresponding changes would be made to Stage 4. Refer to the prior discussion of changing mixSubRound for a discussion of possible changes that might be made.

The output of Stage 2 is used as the input to Stage 3, as shown in FIG. 3; similarly, the input to Stage 4 is the output of Stage 3.

The mixing operations of Stages 2 and 4 increase resistance of the cipher output to differential attacks. Since subkeys are not used in these stages, the processing within each stage is very fast.

Encryption Stage 3

Stage 3 consists of r2 rounds of a keyed Type-1 Feistel. In the preferred embodiment, r2=16, and the round functions are based on data-dependent rotations. Because data-dependent rotation may be susceptible to differential attack, a higher number of rounds of processing is needed to guarantee a strong encryption result. For efficiency on common processors, the same data word is always used to specify the amount of the rotation, with Type-1 structure provided by adding one of the other data words into this rotation value for each subround. Using the same data word to specify the rotation value enables an implementation to be optimized, in that a single, predefined register always contains the rotation value. Adding another data word into this value allows the amount of rotation to change, providing more randomness, without the performance penalty associated with multiple sources for rotation values.

In accordance with the approach used for a Type-1 Feistel, d subrounds of processing are performed during each round, where d is the number of words in the data block.

Figure 6A:
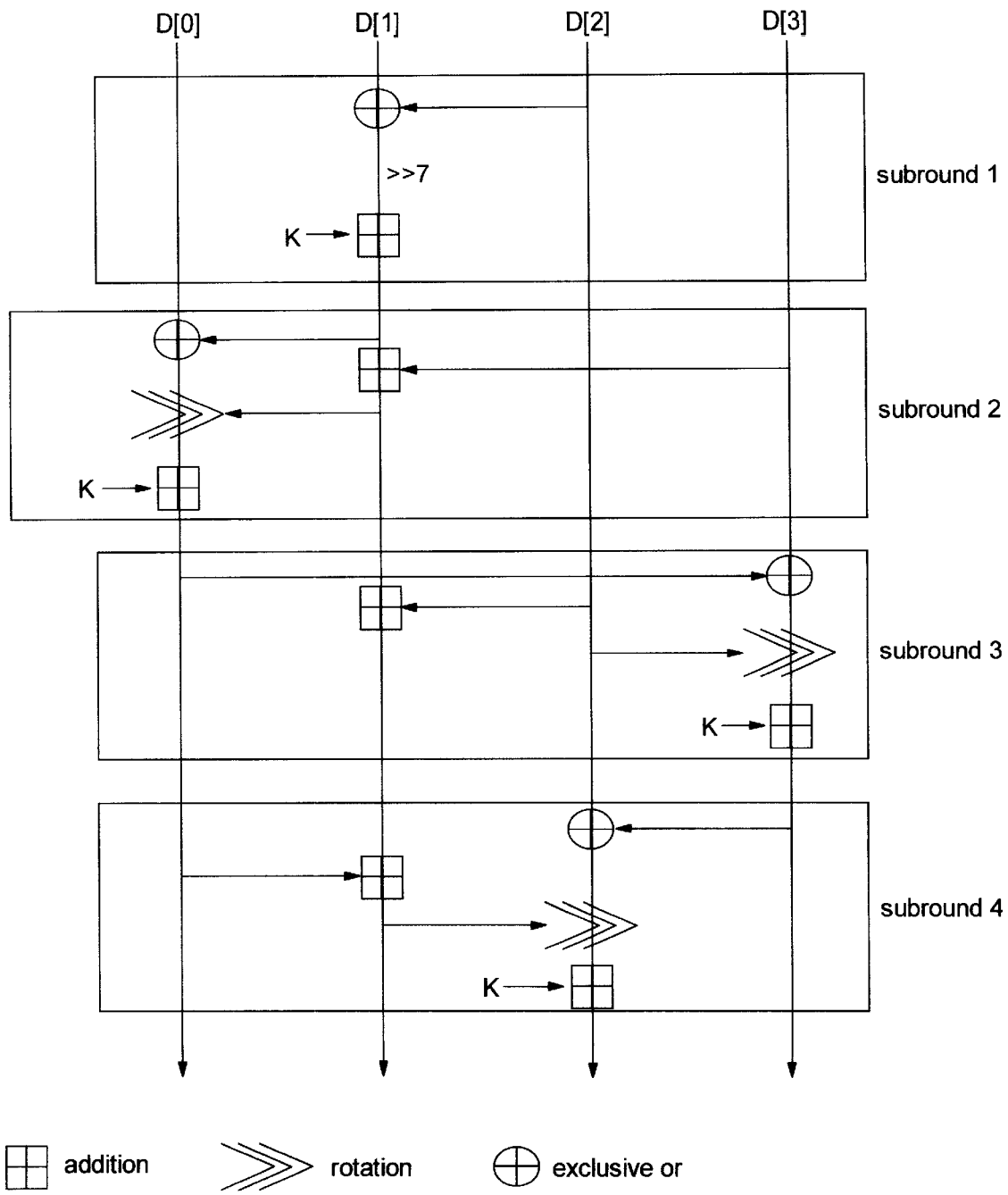
FIG. 6A shows a flow diagram of the process used during Stage 3 to complete an even-numbered round of encryption.
Figure 6B:
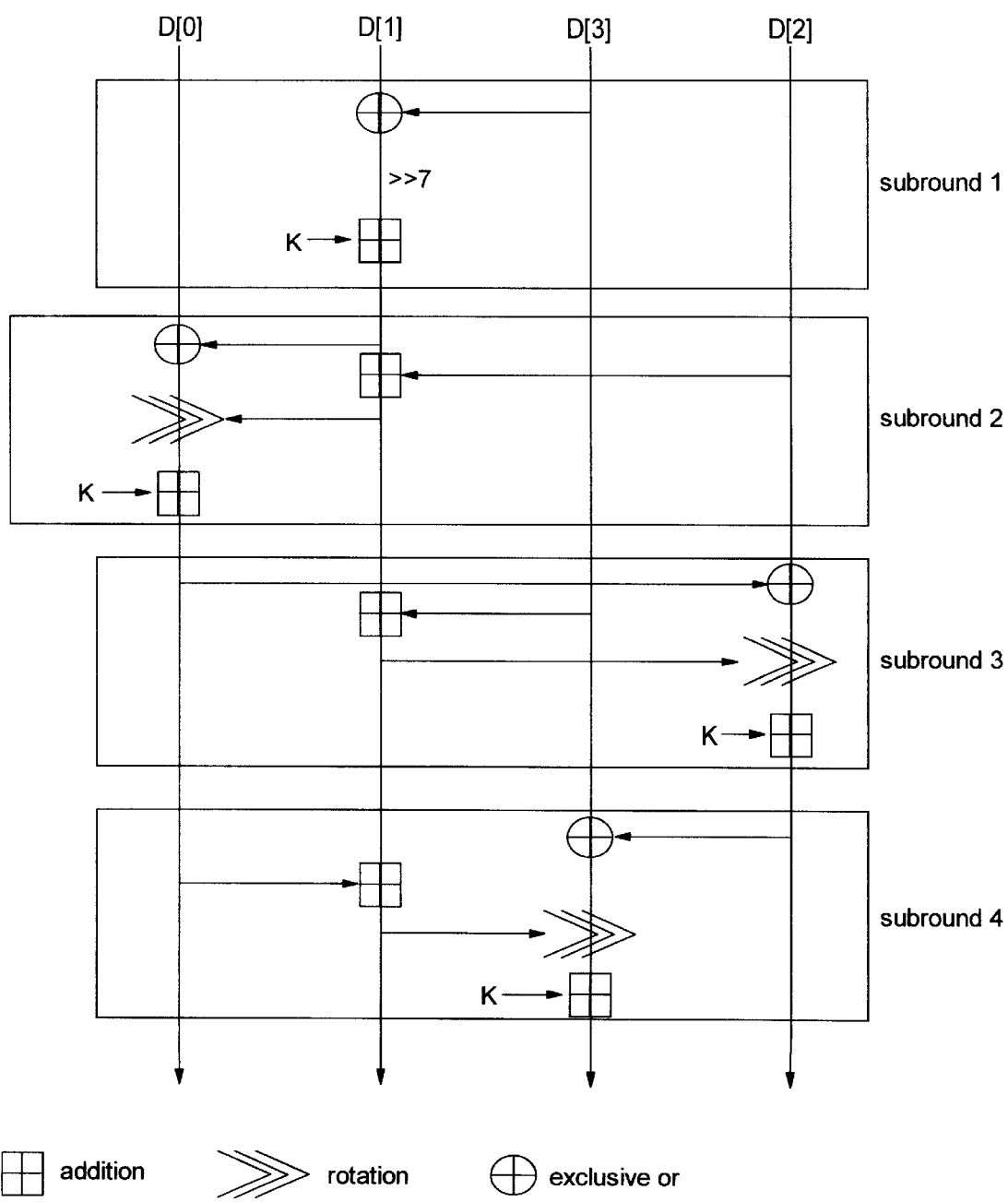
FIG. 6B shows a flow diagram of the process used during Stage 3 to complete an odd-numbered round of encryption.

The structure used for Stage 3 is diagramed in FIGS. 6A and 6B, and can be specified by the following "C" code:

```
/* Stage 3: processes each of r2 round . . .*/
n = d;                          /* starts at d for this stage */
for (i = 0; < r2; i += 2) {
/* process an even round...*/
D[1] ^= D[2];                   /* begin subround 1 */
D[1] = ROTATE (D[1], 7, w) + E[n++];
D[0] ^= D[1];                   /* begin subround 2*/
D[1] += D[3];
D[0] = ROTATE (D[0], D[1], w) +E[n++];
D[3] ^= D[0];                   /* begin subround 3 */
D[1] += D[2];
D[3] = ROTATE (D[3], D[1], w) + E[n++];
D[2] ^= D[3];                   /* begin subround 4 */
D[1] += D[0];
D[2] = ROTATE (D[2], D[1], w) + E[n++];
/* process an odd round . . . */
D[1] ^= D[3];                   /* begin subround 1 */
D[1] = ROTATE (D[1], 7, w) + E[n++];
D[0] ^= D[1];                   /* begin subround 2 */
D[1] += D[2];
D[0] = ROTATE (D[0], D[1], w) +]E[n++];
D[2] ^= D[0];                   /* begin subround 3 */
D[1] += D[3];
D[2] = ROTATE (D[2], D[1], w) + E[n++];
D[3] ^= D[2];                   /* begin subround 4 */
D[1] += D[0];
D[3] = ROTATE (D[3], D[1], w) + E[n++];
}
```

As will be understood by one skilled in the art, this "C" language code specifies the processing for 2 rounds. The first set of statements is used for an even-numbered round, and corresponds to the flow diagram in FIG. 6A. The second set of statements is used for an odd-numbered round, and corresponds to the flow diagram in FIG. 6B.

The processing for an even-numbered round begins with a subround that performs an exclusive OR operation, where the two operands are the data words D[1] and D[2]. The result becomes the new value of D[1]. Next, D[1] is rotated 7 positions to the left. A subkey from the expanded key array is added to this rotated value, forming yet another new value for D[1]. A different subkey is used in each subround processed during Stage 3. This is achieved by initializing the subkey index, n, to the value of the variable d when encryption begins, and incrementing the value of this index each time it is used. (The subkey index begins at d in Stage 3 because the subkeys preceding d in the expanded key array were previously used in Stage 1 of encryption. If the subkey selection process of Stage 1 is changed, the index calculation of this Stage 3 does not necessarily need to change. If it is desired to used a different key for each subround, then the value used for n will need to change to align with the values used in Stage 1, using the appropriate mathematical equation that will be obvious to one of ordinary skill in the art. If subkeys may be re-used, then the value used for n does not need to change from being initialized to the value of d, and incrementing for each subround.)

In the second subround, the new value of D[1] is then exclusive OR'd with D[0], forming a new value for D[0]. The data word in D[3] is then added to D[1], replacing the existing value of D[1]. This new value of D[1] is used as the next rotation value, where the word to be rotated this time is D[0]. After the rotation, the next subkey is added to the rotated value, with the result used as a new value for D[0]. Since the value of D[3] was added to D[1] to generate the rotation value used when rotating D[0], D[3] is affecting the word in D[0] according to the approach of a Feistel Type-1. However, it can be seen that when a rotation value in Stage 3 is data-dependent, that data is always located in D[1]. This allows the software or hardware implementing the present invention to operate more efficiently, by referring to a single source (the location where D[1] is stored) to determine the rotation value. This approach provides a significant advantage over existing symmetric block Feistel ciphers which perform data-dependent rotation, which refer to multiple sources for the rotation values and thereby suffer poor performance on processors having a limited number of registers.

The third and fourth subrounds for the even-numbered rounds are similar. In the third subround, D[0] is exclusive OR'd with D[3], forming a new D[3]. Next, D[2] is added to D[1], so that D[2] can be used as the next value to impact the data-dependent rotation. D[3] is the word to be rotated in this subround. After the rotation, a word from the expanded key array is added to D[3]. In the fourth subround, D[3] is exclusive OR'd with D[2]. D[0] is then added to D[1], so that D[0] will also impact data-dependent rotation. D[2] is the final word to be rotated, after which a word from the expanded key array is added to the D[2] value.

By the end of this even-numbered round, all of the data words have been rotated, the value of each data word has impacted a rotation operation, each data word has been exclusive OR'd with another data word, and each data word has a new value.

For an odd-numbered round, the processing is similar to that just described for even rounds. The only difference is the order in which the different data words are used by the operations, as shown by the "C" language statements.

As stated earlier, a different approach to subkey selection may be used within the operations of this stage without deviating from the inventive concepts of this invention. For example, instead of incrementing the subkey index by one for each usage (in the statements invoking the ROTATE function), the amount of increment could be some different number, such as even numbers in sequence, or odd numbers in sequence, etc. Corresponding changes must then be made to the Stage 3 decryption subkey selection computations.

Decryption

Decryption is simply the reverse of encryption, running the same operations in the reverse order, reversing the addition and subtraction operations. Referring to the diagrams in FIGS. 3–6, the decryption process corresponds to using the operations shown in the diagrams, with these changes: (1) the order of the stages is reversed; (2) the operations are processed from the bottom of the diagrams towards the top; (3) each addition or subtraction operation is replaced by a subtraction or addition operation, respectively; and (4) each rotation operation rotates to the right instead of to the left. This process will now be described in detail, using "C" language statements to describe the preferred embodiment.

The preferred embodiment of the decryption phase is described using five stages, to correspond to the preferred embodiment on the encryption phase which was described using five stages. It will be understood by one skilled in the art that any changes made to the preferred embodiment of the encryption phase (according to the alternatives discussed herein, for example changing the block size) must be reflected by corresponding changes to the decryption phase. Note that the stage numbering used to describe the decryption phase uses numbers 1 through 5, in that order (where the decryption stages 1 through 5 correspond to encryption stages 5 though 1, in descending order).

Decryption Stages 1 and 5

Decryption Stages 1 and 5 of the preferred embodiment consist of simply subtracting one subkey word from each of the data words, which in "C" code can be specified as:

```
/* Decryption Stage 1: subtract subkeys from all data words */
for (j = 0; j < d;j++)
    D[j] -= E[d*(r2 + 1) + j];
/* Decryption Stage 5: subtract subkeys from all data words */
for (j = 0;j < d;j++)
    D[j] -= E[j];
```

As will be understood by one skilled in the art, the result of the "C" code for stage 1 is to iterate d times, where d is the number of words in each block, using an iteration counter, j. The d iterations together comprise the single round of Stage 1 processing of the preferred embodiment. Each word D[0] through D[d−1] from the data block has the corresponding word E[d*(r2+1)] through E[(d*(r2+1))+d−1] from the expanded key array subtracted from it. The result of this subtraction is then used as the new value of the data block word D[0] through D[d−1]. When 4-word blocks are used, the last 4 subkeys (elements E[n−3] through E[n]) are used each time the Stage 1 process is performed.

The result of the "C" code for stage 5 is also to iterate d times, using an iteration counter j. These d iterations comprise the single round of Stage 5 processing of the preferred embodiment. Each word D[0] through D[d−1] from the data block has the corresponding word E[0] through E[d−1] from the expanded key array subtracted from it. The result of this subtraction is then used as the new value of the data block word D[0] through D[d−1]. When 4-word blocks are used, the first 4 subkeys (elements E[0] through E[3]) are used each time the Stage 5 process is performed.

The new data block created by operation of Stage 1 becomes the input to Stage 2. The input to Stage 5 comes from the output of Stage 4, and the output of Stage 5 is used as the resulting plaintext block for the block of data being decrypted.

Decryption Stages 2 and 4

Stages 2 and 4 are identical to Stages 2 and 4 of encryption. Stage 2 decryption uses mixing, with addition and left rotation. This corresponds to the inverse of Encryption Stage 4. Stage 4 decryption uses inverse mixing, with subtraction and right rotation. This corresponds to the inverse of Encryption Stage 2. Again, each of these stages uses r1 rounds of inverse mixing. In the preferred embodiment, r1=2. Each full round consists d subrounds, where each subround uses a different data word as source.

Refer to the description of Encryption Stages 2 and 4, above, for "C" language statements showing a specification that can be used for Decryption Stages 2 and 4, respectively, and for a detailed description of the operation of the stages.

As stated previously, the diagram shown in FIG. 4 for encryption Stage 2 can be used to illustrate decryption, for decryption Stage 4, by reading the diagram from the bottom up, changing addition to subtraction, and changing left rotation to right rotation. Similarly, the diagram shown in FIG. 5 for encryption Stage 4 can be used to illustrate decryption Stage 2, by making similar changes as for FIG. 4.

The output of Stage 2 is used as the input to Stage 3, as shown in FIG. 3; similarly, the input to Stage 4 is the output of Stage 3.

Decryption Stage 3

Decryption Stage 3 consists of r2 rounds of a keyed Type-1 Feistel, based on data-dependent rotations. In the preferred embodiment, r2=16. For efficiency on common processors, the same data word is always used to specify the amount of the rotation, as previously described for encryption. Subtracting another data word from this value allows the amount of rotation to change, providing more randomness, without the performance penalty associated with multiple sources for rotation values.

In accordance with the approach used for a Type-1 Feistel, d subrounds of processing are performed during each round, where d is the number of words in the data block.

The structure used for Decryption Stage 3 can be specified by the following "C" code:

```
/* Decryption Stage 3: processes each of r2 rounds. . . */
n = (d * (r2 + 1)) − 1;                /* initialize subkey index */
for (i = 0; i < r2; i += 2) {
/* process an even round . . . */
D[3] -= E[n--];                        /* begin subround 1*/
D[3] = IROTATE (D[3], D[1], w);
D[1] -= D[0];
D[3] ^= D[2];
D[2] -= E[n--];                        /* begin subround 2*/
D[2] = IROTATE (D[2], D[1], w);
D[1] -= D[3];
D[2] ^= D[0];
D[0] -= E[n--];                        /* begin subround 3*/
D[0] = IROTATE (D[0], D[1], w);
D[1] -= D[2];
D[0] ^= D[1];
D[1] -= E[n--];                        /* begin subround 4*/
D[1] = IROTATE (D[1], D[7], w);
D[1] ^= D[3];
/* process an add round . . . */
D[2] -= E[n--];                        /* begin subround 1*/
D[2] = IROTATE (D[2], D[1], w);
D[1] -= D[0];
D[2] ^= D[3];
D[3] -= E[n--];                        /* begin subround 2*/
D[3] = IROTATE (D[3], D[1], w);
D[1] -= D[2];
D[3] ^= D[0];
D[0] -= E[n--];                        /* begin subround 3*/
```

-continued

```
D[0] = IROTATE (D[0], D[1], w);
D[1] -= D[3];
D[0] ^= D[1];
D[1] -= E[n--];                  /* begin subround 4*/
D[1] = IROTATE (D[1], D[7], w);
D[1] ^= D[2];
}
```

As will be understood by one skilled in the art, this "C" language code specifies the processing for 2 rounds. The first set of statements is used for an even-numbered round, and the second set of statements is used for an odd-numbered round. As previously indicated, these statements correspond to the diagrams shown for encryption in FIGS. 6B and 6A, respectively, if those diagrams are read from the bottom up, addition is changed to subtraction, and left rotation is changed to right rotation.

The stage begins by first initializing the subkey index, to point to the last subkey from a group of 8 subkeys that were used during encryption for one iteration through the Stage 3 processing. Then processing for an even-numbered round of decryption begins, and that subkey value is subtracted from D[3]. The subkey index is decremented. Then, D[3] is rotated to the right, where the amount of rotation is determined using the value in D[1]. Next, the value of D[0] is subtracted from D[1]. Finally, this subround performs an exclusive OR operation, where the two operands are the data words D[2] and D[3]. The result becomes the new value of D[3].

In the second subround, the next-preceding subkey (that is, the one indexed by the previously-decremented value) is subtracted from D[2], and the index is again decremented The new value of D[2] is then rotated to the right, with the amount of rotation again specified by the value in D[1]. The value in D[3] is then subtracted from D[1]. Finally, D[0] is exclusive OR'd with D[2], forming a new value for D[2].

The third and fourth subrounds for the even-numbered rounds are similar. In the third subround, the next preceding subkey is subtracted from D[0]; D[0] is rotated to the right by the amount indicated by D[1]; D[2] is subtracted from D[1]; and D[1] is exclusive OR'd with D[0], forming a new D[0]. In the fourth subround, the next preceding subkey is subtracted from D[1]; D[1] is rotated 7 positions to the right; and D[3] is exclusive OR'd with D[1], forming a new value for D[1].

By the end of this even-numbered round, all of the data words have been rotated, the value of each data word has impacted a rotation operation, each data word has been exclusive OR'd with another data word, and each data word has a new value.

For an odd-numbered round, the processing is similar to that just described for even rounds. The only difference is the order in which the different data words are used by the operations, as shown by the "C" language statements.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A method of carrying out a symmetric key block cipher using multiple stages, comprising the steps of:

performing a first simple arithmetic operation in a first stage;

performing a Type-3 Feistel unkeyed mixing operation in a second stage;

performing a Type-1 Feistel keyed data-dependent rotation transform in a third stage, wherein a fixed location is used to specify an amount of the data-dependent rotation for each of a plurality of rounds of the third stage;

performing a Type-3 Feistel unkeyed inverse mixing operation in a fourth stage; and performing a second simple arithmetic operation in a fifth stage, wherein the first simple arithmetic operation and the second simple arithmetic operation may be identical.

2. The method according to claim 1, wherein one or more of the steps is embodied in a hardware chip.

3. The method according to claim 1, wherein:

the first simple arithmetic operation is one of (1) an addition operation, (2) a subtraction operation, or (3) an exclusive OR operation; and the second simple arithmetic operation is one of (1) the addition operation, (2) the subtraction operation, or (3) the exclusive OR operation.

4. The method according to claim 3, wherein operands of the first and second simple arithmetic operations are a word being used to encipher a selected data block and a generated key value which has a length identical to that of the word.

5. The method according to claim 1, wherein a plurality of first feedback operations are performed between distinct rounds of the Type-3 Feistel unkeyed mixing operation, and a plurality of second feedback operations are performed between distinct rounds of the Type-3 Feistel unkeyed inverse mixing operation.

6. The method according to claim 5, wherein the first feedback operation is an addition operation and the second feedback operation is a subtraction operation.

7. The method according to claim 1, wherein the Type-3 Feistel unkeyed mixing operation and the Type-3 Feistel unkeyed inverse mixing operation retrieve values from 2 substitution boxes.

8. The method according to claim 1, wherein a round function used in each of a plurality of subrounds of the plurality of rounds of the third stage for the Type-1 Feistel keyed data-dependent rotation transform comprises the steps of:

performing an exclusive OR operation using two selected ones of a plurality of words from a block being enciphered, wherein one of the two selected ones is a word being transformed by a current one of the subrounds;

adding, except in an initial even-numbered one of the plurality of subrounds and an initial odd-numbered one of the plurality of subrounds, a round-specific one of the plurality of words to a predetermined one of the plurality, wherein the predetermined one stays constant throughout all of the plurality of subrounds for all of the plurality of rounds; and performing the data-dependent rotation operation on the word being transformed, using the predetermined one as the fixed location to specify the amount of the data-dependent rotation operation, except in the initial even-numbered and initial odd-numbered subrounds which use a fixed value for the amount.

9. The method according to claim 1, wherein the cipher supports a variable number of rounds in at least one of the stages, a variable length of generated key values to be used with the cipher in at least the Type-1 Feistel keyed data-dependent rotation transform, and a variable length of input blocks to be enciphered.

10. A system for carrying out a symmetric key block cipher using multiple stages on a computer, comprising:

means for performing a first simple arithmetic operation in a first stage;

means for performing a Type-3 Feistel unkeyed mixing operation in a second stage;

means for performing a Type-1 Feistel keyed data-dependent rotation transform in a third stage, wherein a fixed location is used to specify an amount of the data-dependent rotation for each of a plurality of rounds of the third stage, means for performing a Type-3 Feistel unkeyed inverse mixing operation in a fourth stage; and means for performing a second simple arithmetic operation in a fifth stage, wherein the first simple arithmetic operation and the second simple arithmetic operation may be identical.

11. The system according to claim 10, wherein:

the first simple arithmetic operation is one of (1) an addition operation, (2) a subtraction operation, or (3) an exclusive OR operation; and the second simple arithmetic operation is one of (1) the addition operation, (2) the subtraction operation, or (3) the exclusive OR operation.

12. The system according to claim 11, wherein operands of the first and second simple arithmetic operations are a word being used to encipher a selected data block and a generated key value which has a length identical to that of the word.

13. The system according to claim 10, wherein a plurality of first feedback operations are performed between distinct rounds of the Type-3 Feistel unkeyed mixing operation, and a plurality of second feedback operations are performed between distinct rounds of the Type-3 Feistel unkeyed inverse mixing operation.

14. The system according to claim 13, wherein the first feedback operation is an addition operation and the second feedback operation is a subtraction operation.

15. The system according to claim 10, wherein the Type-3 Feistel unkeyed mixing operation and the Type-3 Feistel unkeyed inverse mixing operation retrieve values from 2 substitution boxes.

16. The system according to claim 10, wherein a round function used in each of a plurality of subrounds of the plurality of rounds of the third stage for the Type-1 Feistel keyed data-dependent rotation transform comprises:

means for performing an exclusive OR operation using two selected ones of a plurality of words from a block being enciphered, wherein one of the two selected ones is a word being transformed by a current one of the subrounds;

means for adding, except in an initial even-numbered one of the plurality of subrounds and an initial odd-numbered one of the plurality of subrounds, a round-specific one of the plurality of words to a predetermined one of the plurality, wherein the predetermined one stays constant throughout all of the plurality of subrounds for all of the plurality of rounds; and means for performing the data-dependent rotation operation on the word being transformed, using the predetermined one as the fixed location to specify the amount of the data-dependent rotation operation, except in the initial even-numbered and initial odd-numbered sub-rounds which use a fixed value for the amount.

17. The system according to claim 10, wherein the cipher supports a variable number of rounds in at least one of the stages, a variable length of generated key values to be used with the cipher in at least the Type-1 Feistel keyed data-dependent rotation transform, and a variable length of input blocks to be enciphered.

18. A computer program product for carrying out a symmetric key block cipher using multiple stages on a computer, the computer program product embodied in a computer-readable medium and comprising:

computer-readable program code means for performing a first simple arithmetic operation in a first stage;

computer-readable program code means for performing a Type-3 Feistel unkeyed mixing operation in a second stage;

computer-readable program code means for performing a Type-1 Feistel keyed data-dependent rotation transform in a third stage, wherein a fixed location is used to specify an amount of the data-dependent rotation for each of a plurality of rounds of the third stage;

computer-readable program code means for performing a Type-3 Feistel unkeyed inverse mixing operation in a fourth stage; and computer-readable program code means for performing a second simple arithmetic operation in a fifth stage, wherein the first simple arithmetic operation and the second simple arithmetic operation may be identical.

19. The computer program product according to claim 18, wherein:

the first simple arithmetic operation is one of (1) an addition operation, (2) a subtraction operation, or (3) an exclusive OR operation; and the second simple arithmetic operation is one of (1) the addition operation, (2) the subtraction operation, or (3) the exclusive OR operation.

20. The computer program product according to claim 19, wherein operands of the first and second simple arithmetic operations are a word being used to encipher a selected data block and a generated key value which has a length identical to that of the word.

21. The computer program product according to claim 18, wherein a plurality of first feedback operations are performed between distinct rounds of the Type-3 Feistel unkeyed mixing operation, and a plurality of second feedback operations are performed between distinct rounds of the Type-3 Feistel unkeyed inverse mixing operation.

22. The computer program product according to claim 21, wherein the first feedback operation is an addition operation and the second feedback operation is a subtraction operation.

23. The computer program product according to claim 18, wherein the Type-3 Feistel unkeyed mixing operation and the Type-3 Feistel unkeyed inverse mixing operation retrieve values from 2 substitution boxes.

24. The computer program product according to claim 18, wherein a round function used in each of a plurality of subrounds of the plurality of rounds of the third stage for the Type-1 Feistel keyed data-dependent rotation transform comprises:

computer-readable program code means for performing an exclusive OR operation using two selected ones of a plurality of words from a block being enciphered, wherein one of the two selected ones is a word being transformed by a current one of the subrounds;

computer-readable program code means for adding, except in an initial even-numbered one of the plurality of subrounds and an initial odd-numbered one of the plurality of subrounds, a round-specific one of the plurality of words to a predetermined one of the plurality, wherein the predetermined one stays constant throughout all of the plurality of subrounds for all of the plurality of rounds; and computer-readable program code means for performing the data-dependent rotation operation on the word being transformed, using the predetermined one as the fixed location to specify the amount of the data-dependent rotation operation, except in the initial even-numbered and initial odd-numbered subrounds which use a fixed value for the amount.

25. The computer program product according to claim 18, wherein the cipher supports a variable number of rounds in at least one of the stages, a variable length of generated key values to be used with the cipher in at least the Type-1 Feistel keyed data-dependent rotation transform, and a variable length of input blocks to be enciphered.

* * * * *